United States Patent [19]

Häggström et al.

[11] Patent Number: 4,581,201
[45] Date of Patent: Apr. 8, 1986

[54] FLEXIBLE CONTROL ROD FOR A NUCLEAR REACTOR

[75] Inventors: Bo Häggström; Erik Jönsson, both of Västerås, Sweden

[73] Assignee: AB Asea-Atom, Västeras, Sweden

[21] Appl. No.: 464,002

[22] Filed: Feb. 4, 1983

[30] Foreign Application Priority Data

Feb. 8, 1982 [SE] Sweden ................... 8200706

[51] Int. Cl.⁴ .............................................. G21C 7/10
[52] U.S. Cl. ..................................... 376/335; 376/327
[58] Field of Search ............... 376/335, 333, 327, 334

[56] References Cited

U.S. PATENT DOCUMENTS

| | | | |
|---|---|---|---|
| 3,048,532 | 8/1962 | Thorp, II | 376/327 X |
| 3,080,918 | 3/1963 | Natland | 376/333 X |
| 3,115,452 | 12/1963 | Rock | 376/327 |
| 3,163,583 | 12/1964 | Widner et al. | 376/334 |
| 3,234,104 | 2/1966 | Gale et al. | 376/327 |
| 3,264,192 | 8/1966 | Wimunc | 376/334 |
| 3,309,118 | 3/1967 | Anthony | 376/327 X |
| 3,332,850 | 7/1967 | Jonsson et al. | 376/327 |
| 4,001,078 | 1/1977 | Doll | 376/335 X |

FOREIGN PATENT DOCUMENTS

| | | | |
|---|---|---|---|
| 0662224 | 4/1965 | Belgium | 376/335 |
| 1156517 | 10/1963 | Fed. Rep. of Germany. | |
| 0008292 | 1/1977 | Japan | 376/334 |
| 0067491 | 6/1977 | Japan | 376/335 |
| 7610815 | 9/1976 | Sweden. | |
| 1023273 | 3/1966 | United Kingdom | 376/335 |
| 1295283 | 11/1972 | United Kingdom | 376/335 |

*Primary Examiner*—Deborah L. Kyle
*Assistant Examiner*—Dan Wasil
*Attorney, Agent, or Firm*—Watson, Cole, Grindle & Watson

[57] ABSTRACT

A flexible control rod for a nuclear reactor is built up of first, second, third and fourth absorber wings which are arranged in a cruciform configuration. Each wing is divided into a number of wing elements by slots extending substantially perpendicularly to the crossing line of the wings. The first and the third wings are arranged in a first plane with the slots in these wings located pairwise in line with each other, and the second and fourth wings are arranged in a second plane and also with their associated slots located pairwise in line. Further, the slots in the first plane are displaced in parallel in the direction of the crossing line relative to the slots in the second plane, and the portions of the wing elements adjoining the crossing line of the wings are provided with recesses. This arrangement gives good flexibility without undue loss of strength.

4 Claims, 4 Drawing Figures

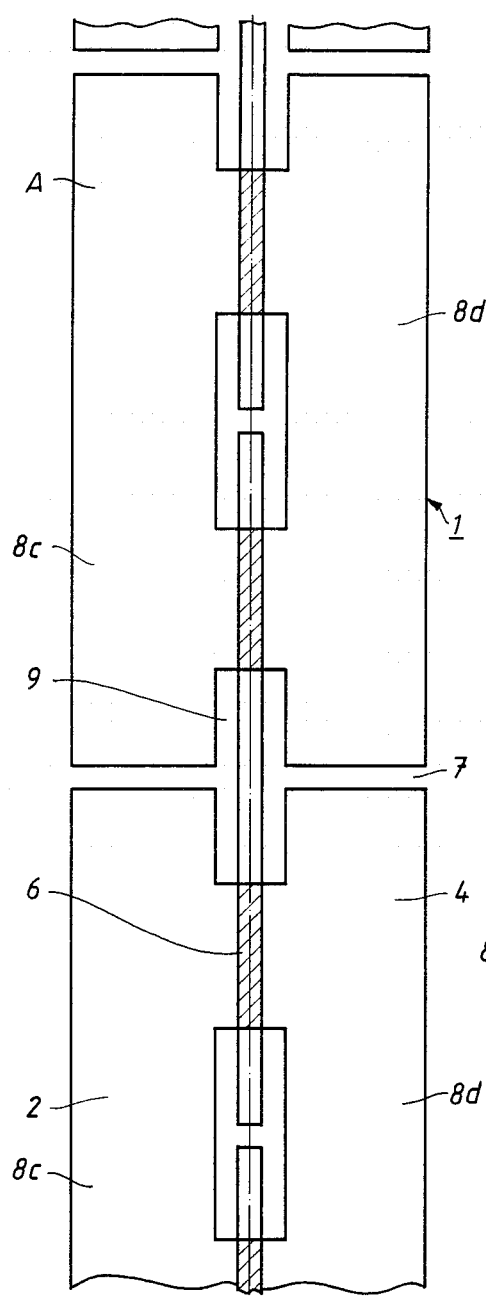
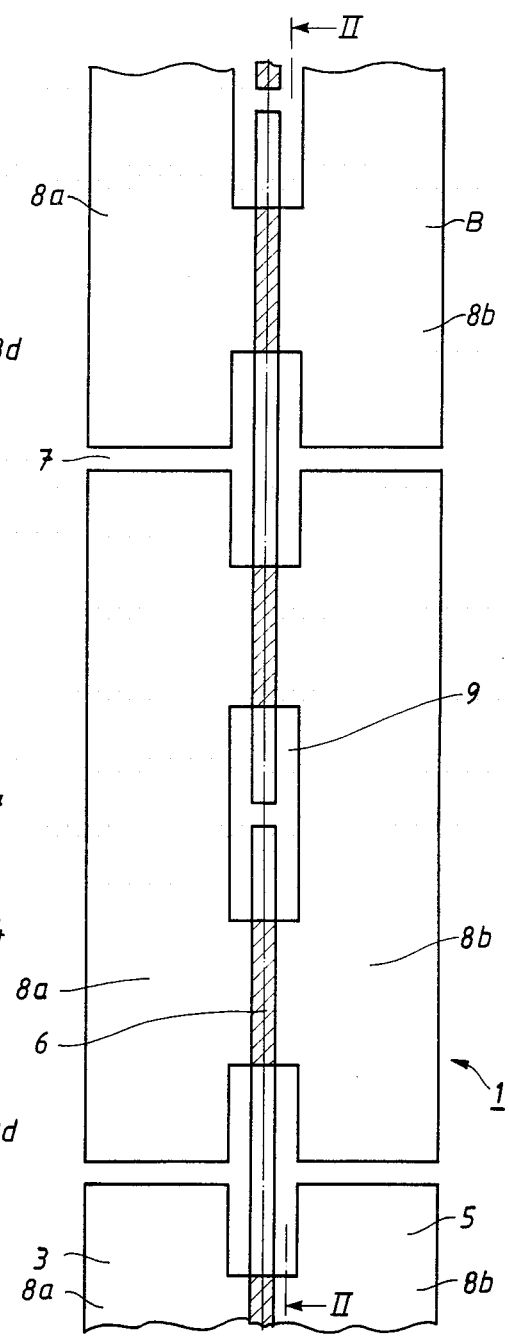
FIG. 2
FIG. 1

FLEXIBLE CONTROL ROD FOR A NUCLEAR REACTOR

TECHNICAL FIELD

The present invention relates to a flexible control rod for a nuclear reactor which is built up of a number of absorber wings that are supported by a control rod shaft.

In certain types of nuclear reactors in which the power is controlled by means of control rods inserted into the reactor core, it is of great importance to make the control rod gaps between the fuel assemblies in the core as narrow as possible. The width of these gaps is determined by the thickness of the absorber wings and by the fact that there must be a certain play between the absorber wings and the limiting surfaces of the gap. This play is necessary to prevent the control rods from becoming stuck in the gap, e.g., as a result of deformation of the control rods and/or the fuel channels, or for some other reason. If the control rod is very stiff, it may be necessary to dimension the gaps so that their width becomes considerably greater than the thickness of the absorber wings, which in turn results in a deterioration of the fuel economy of the reactor.

DISCUSSION OF PRIOR ART

It is thus important to reduce the noted play to a minimum. One known way of achieving this is to make the control rod more flexible, permitting it to pass through a narrower gap without getting stuck, even in the face of deformations of the gap which will arise in use of the reactor. However, the prior art embodiments of flexible control rods have normally been of a construction which has made them too weak, which is clearly not desirable.

BRIEF STATEMENT OF INVENTION

The control rod according to the present invention is composed in a known manner of oblong first and second wing portions of absorber material, which wings are arranged in a cruciform configuration. By means of slots extending substantially perpendicularly to the imaginary crossing line of the wings, each wing portion is divided into a plurality of wing elements. Characteristic of the invention is that the first and second wing portions of one wing are arranged in a first plane with the slots in these wing portions located pairwise in line with each other and the first and second wing portions of the other wing are arranged in a second plane and also with the respective slots therein aligned pairwise, and that the slots in the first plane are parallel-displaced in the elongate direction of the control rod relative to the slots in the second plane, and that portions of the wing elements adjoining the crossing line of the wings are provided with recesses.

In the known embodiment, transversely positioned slots in one coplanar pair of absorber wing portions are disposed at the same axial level as the corresponding slots in the other coplanar pair of wing portions, and the control rod at these levels is more or less severed and therefore becomes too flexible. In a control rod according to the present invention, two slots at most will be located at any given axial level, thereby obtaining a suitable balance between flexibility and stiffness in the control rod. Control of the flexibility of the control rod is achieved by providing the wing elements—in the portions adjoining the crossing line of the wings—with recesses. By making the recesses longer or shorter in a direction along the crossing line, the flexibility in the control rod can be increased or decreased.

To obtain an evenly distributed flexibility along the control rod, the slots are suitably displaced by approximately half the length of a wing element, whereby the distance between levels at which two adjacent slots, lying in different planes, traverse the crossing line becomes substantially constant along the entire length of the control rod.

Stiffening of the control rod can be achieved by reducing the width of the slots by means of projections arranged in the slots. If the stiffening becomes excessive, it can easily be reduced by reducing the height of such slot-located projections.

DESCRIPTION OF DRAWINGS

Two embodiments of control rods in accordance with the invention will now be described, by way of example, with reference to the accompanying schematic drawings, in which:

FIG. 1 shows part of a first embodiment of control rod according to the invention, partially sectioned and viewed from the front, FIG. 2 shows the control rod of FIG. 1 viewed from the side, sectioned on the line II—II.

DESCRIPTION OF PREFERRED EMBODIMENTS

Figure 3:
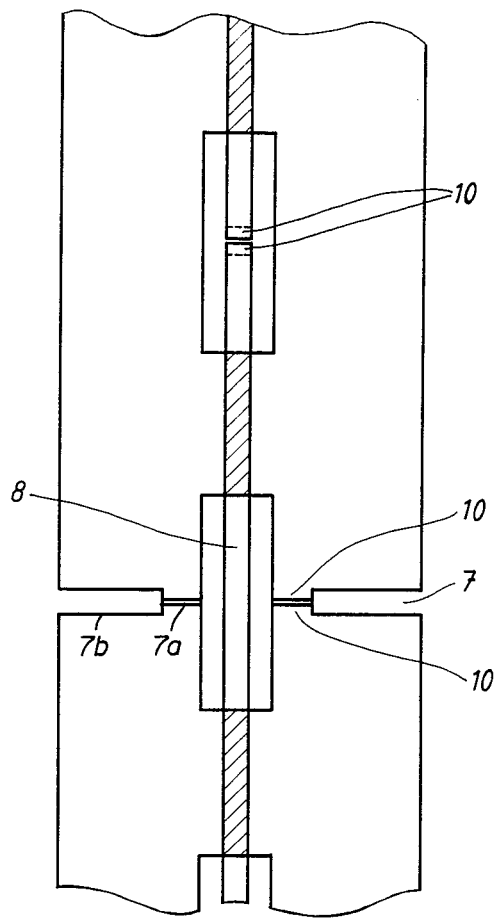
FIG. 3 shows part of a second embodiment of control rod provided with projections in the slots.
Figure 4:
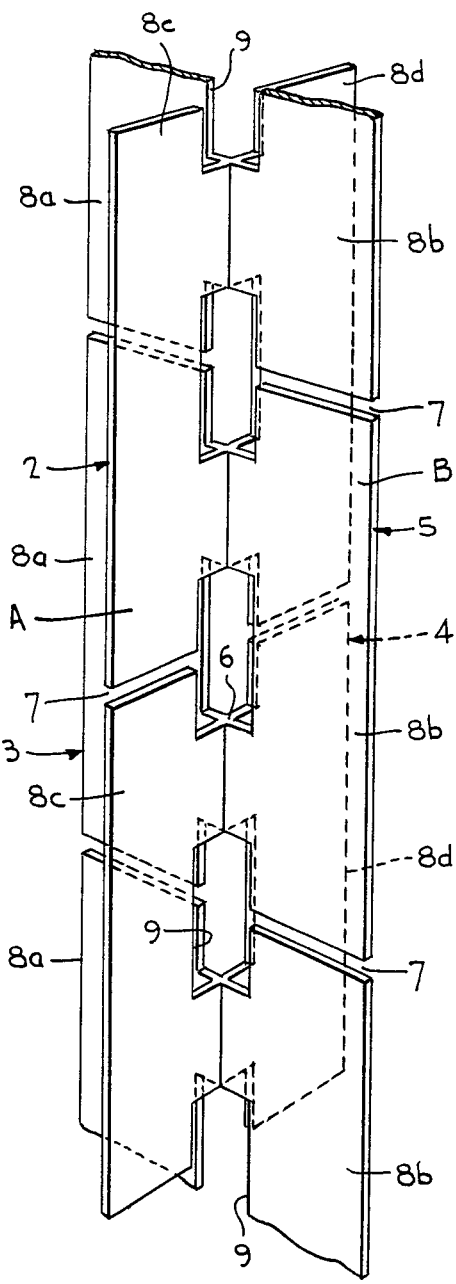
FIG. 4 shows a perspective view of the part of the first embodiment of control rod shown in FIGS. 1 and 2.

In FIGS. 1 and 2, the numeral 1 designates part of a flexible control rod, the lower portion of which is provided with a control rod shaft (not shown) for connection to a drive device (also not shown). The illustrated part of the control rod consists of two wings A and B of absorber material arranged in a cruciform configuration and joined together along an imaginary crossing line (shown as the chain line 6). Each wing is composed of two wing portions 2,4 and 3,5, respectively. By means of slots 7, which extend substantially perpendicularly to the crossing line 6, each wing portion is divided into wing elements 8a, 8b, 8c and 8d.

The wing elements 8a and 8b are arranged in the same plane and at the same axial level in the control rod, so that the slots 7 between the elements will be in alignment. Similarly, the wing elements 8c and 8d are positioned in the same plane and at the same axial level but are parallel-displaced in the axial direction relative to the elements 8a and 8b. The control rod is given an increased flexibility by providing the elements 8a to 8d, in their portions adjoining the crossing line 6 of the wings, with recesses 9. Further, these recesses 9 are each disposed so as to bridge the slots 7 in the wing plane perpendicular thereto. Between the recesses 9, the wing elements 8 are fixed to each other in any convenient way adjacent to the imaginary crossing line 6. With the construction described, deformation zones are provided at spaced-apart intervals along the control rod, these zones being centered on each aligned pair of slots 7, each zone being of a length approximately corresponding to the length of the bridging recess 9.

To obtain an evenly distributed flexibility along the length of the control rod, the slots 7 in the wing portions 2 and 4 are displaced by approximately one half of the length of an element in relation to the slots 7 in the wing portions 3 and 5.

Finally, FIG. 3 shows how the flexibility of a control rod in accordance with the invention can be reduced by providing the wing elements with projections 10 locally arranged in the slots 7 so as to provide the slots with two portions 7a and 7b, portion 7a being in communication with a recess 9 and having a thinner width in the elongated direction of the control rod as compared to the second portion 7b. Upon sufficient bending of the control rod, contact between adjacent projections 10 occurs, resulting in a tension load in the appropriate bending wing element(s) 8. These projections 10 thus increase the flexural resistance of the control rod within a wide range.

We claim:

1. In a flexible, elongated control rod for a nuclear reactor which comprises elongated first and second wings of absorber material which are connected together along an imaginary crossing line to provide a cruciform configuration, each of said first and second wings including first and second wing portions which extend away from said imaginary crossing line, each of said first and second wing portions of each wing being divided into a plurality of elements by slots therein which extend substantially perpendicularly to said imaginary crossing line, the improvement wherein all the slots in said first and second wing portions of said first wing are aligned with one another along the length of said elongated control rod, wherein all the slots in said first and second wing portions of said second wing are aligned with one another along the length of said elongated control rod, wherein the slots in said first and second wing portions of said first wing are displaced along the length of said elongated control rod relative to the slots in the first and second wing portions of said second wing, and wherein each of said first and second wings includes recesses through which said imaginary crossing line passes and which are formed by the elements of the first and second wing portions thereof, at least one recess formed by the elements of one wing being located along the length of said elongated control rod to correspond with a pair of aligned slots in the wing portions of the other wing.

2. The flexible, elongated control rod according to claim 1, wherein all the elements of the first and second wing portions of each wing have equal lengths in the direction of elongation of said elongated control rod and define midpoints therealong, and wherein the slots in the first and second wing portions of one said wing are located along the length of said elongated control rod to correspond with the midpoints of the elements formed in the first and second wing portions of the other wing.

3. The flexible, elongated control rod according to claim 1, wherein each of the elements of each of the first and second wing elements of each wing define a multiplicity of recesses through which said imaginary crossing line passes, said slots in each of said first and second wing portions of each wing communicating with a common recess.

4. The flexible, elongated control rod according to claim 3, wherein each slot which communicates with a common recess includes first and second portions, said first portion being in communication with a recess and having a thinner width in the direction of elongation of said elongated control rod than said second portion.

* * * * *